United States Patent
Van De Sluis et al.

(10) Patent No.: US 12,414,214 B2
(45) Date of Patent: Sep. 9, 2025

(54) CONTROLLER FOR CONTROLLING A LIGHTING UNIT IN AN AREA AND A METHOD THEREOF

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 245 days.

(21) Appl. No.: 18/271,876

(22) PCT Filed: Dec. 24, 2021

(86) PCT No.: PCT/EP2021/087651
§ 371 (c)(1),
(2) Date: Jul. 12, 2023

(87) PCT Pub. No.: WO2022/152552
PCT Pub. Date: Jul. 21, 2022

(65) Prior Publication Data
US 2024/0080955 A1    Mar. 7, 2024

(30) Foreign Application Priority Data
Jan. 12, 2021 (EP) ..................... 21151056

(51) Int. Cl.
*H05B 47/115*  (2020.01)
*H02J 7/00*  (2006.01)

(52) U.S. Cl.
CPC .......... *H05B 47/115* (2020.01); *H02J 7/0047* (2013.01)

(58) Field of Classification Search
CPC ..... H05B 47/115; H05B 45/20; H02J 7/0047; Y02B 20/40
See application file for complete search history.

(56) References Cited

U.S. PATENT DOCUMENTS

| | | | |
|---|---|---|---|
| 2012/0228953 A1* | 9/2012 | Kesler | B60L 53/126 307/104 |
| 2013/0300356 A1* | 11/2013 | Yang | H02J 50/12 320/108 |
| 2016/0006281 A1* | 1/2016 | Zander | H05B 47/11 315/307 |
| 2019/0074718 A1* | 3/2019 | Aliakseyeu | H05B 47/196 |
| 2024/0080955 A1* | 3/2024 | Van De Sluis | H02J 7/0047 |

FOREIGN PATENT DOCUMENTS

| | | |
|---|---|---|
| CN | 107152627 A | 9/2017 |
| CN | 112153777 A | 12/2020 |
| WO | 2014000521 A1 | 1/2014 |

* cited by examiner

Primary Examiner — Ryan Jager

(57) ABSTRACT

A method of controlling a lighting unit in an area is disclosed. The method comprises: obtaining a charging status of a portable device, the charging status indicating whether the portable device is connected to a charger, receive a motion signal indicative of a motion of a user in the area, controlling, if the motion has been detected and if the portable device is connected to the charger, the lighting unit according to a first light setting, and controlling, if the motion has been detected and if the portable device is not connected to the charger, the lighting unit according to a second light setting.

15 Claims, 4 Drawing Sheets

CONTROLLER FOR CONTROLLING A LIGHTING UNIT IN AN AREA AND A METHOD THEREOF

CROSS-REFERENCE TO PRIOR APPLICATIONS

This application is the U.S. National Phase application under 35 U.S.C. § 371 of International Application No. PCT/EP2021/087651, filed on Dec. 24, 2021, which claims the benefit of European Patent Application No. 21151056.5, filed on Jan. 12, 2021. These applications are hereby incorporated by reference herein.

FIELD OF THE INVENTION

The invention relates to a method of controlling a lighting unit in an area and to a computer program product for executing the method. The invention further relates to a controller for controlling a lighting unit in an area. The invention further relates to a lighting system comprising the controller and the lighting unit.

BACKGROUND

Lighting control systems enable control of lighting units in an area when one or more users are detected in the area. The users may be detected using a motion sensor such as a PIR sensor, one or more (passive) RF sensors, a camera, etc. When motion is detected, one or more lighting units may be controlled according to a light setting based on the detected motion. A user may configure the lighting system via a user interface of the lighting system. The user may, for example, associate a light setting with the motion detection, such that when motion is detected, one or more lighting units are controlled according to that light setting. However, in certain situations it may be desirable that the lighting units are not controlled when motion is detected, for instance when a user is sleeping and moving in his or her sleep, or when another user (e.g. a partner of the user) enters the user's bedroom when the user is already asleep.

In other examples, for instance at night, it may be desirable that when a user wakes up at night and moves to the restroom, the light intensity of the light is lower compared to when a user goes to bed. Hence, there is a need for a context-aware motion-based lighting control system.

SUMMARY OF THE INVENTION

It is an object of the present invention to provide a context-aware motion-based lighting control system.

According to a first aspect of the present invention, the object is achieved by a method of controlling a lighting unit in an area, the method comprising:
  obtaining a charging status of a portable device, the charging status indicating whether the portable device is connected to a charger,
  receive a motion signal indicative of a motion of a user in the area,
  controlling, if the motion has been detected and if the portable device is connected to the charger, the lighting unit according to a first light setting, and
  controlling, if the motion has been detected and if the portable device is not connected to the charger, the lighting unit according to a second light setting.

The inventors have realized that when a user goes to sleep, the user typically charges his or her portable devices, such as a smartphone, smart watch, etc. The area may for instance be a bedroom, or any other type of area where people take a rest and/or charge their portable devices. The light setting according to which the lighting unit (which illuminates the area) is controlled is therefore based on the charging status of the portable device. If the motion signal indicative of a motion of a user in the area is received when the portable device is connected to the charger, the lighting unit is controlled according to a first light setting. This first light setting may, for example, be a night light setting with a low brightness. If the motion signal indicative of a motion of a user in the area is received when the portable device is not connected to the charger, the lighting unit is controlled according to a second light setting. This second light setting may, for example, be a default light setting with a brightness higher than the first light setting. By taking the charging status of the portable device into account to determine how to control the light when motion is detected, an improved, context-aware motion-based lighting control system is provided.

The first light setting may have a lower brightness and/or a lower color temperature than the second light setting. This may be beneficial, especially at night when a user typically charges his or her portable device and less light is desirable when a user leaves his or her bed.

The first and/or the second light setting may be selected depending on a time of day at which the motion is detected. If, for example, the motion is detected in the evening, the first light setting may be a light setting with a first intensity and the second light setting may be a light setting with a second intensity higher than the first intensity, while if, for example, motion is detected at night, the first light setting may be a light setting with a third intensity lower than the first intensity.

The motion of the user may be detected by a motion sensor comprised in the portable device. The user may, for example, pick up his or her phone when it is being charged, which may result in the detected motion. The motion signal may be analyzed to determine a type of motion of a user (e.g. walking vs. operating the portable device). It may be desirable that the light setting is different when the motion is representative of a user operating the portable device compared to when the motion is representative of that the user is walking and that the portable device is located in the user's pocket.

The motion of the user may be detected by a sensor device located in the area. The sensor device may, for example, be an RF sensor, a PIR sensor, an ultrasound sensor, etc. configured to generate and/or communicate the motion signal. The motion signal may then be obtained by a controller for controlling the lighting unit.

The method may comprise: obtaining a signal indicative of a user operating the portable device, and controlling, if motion is detected by the sensor device located in the area, if the user is operating the portable device and if the portable device is connected to the charger, the lighting unit according to a third light setting. It may occur that a user moves when operating a portable device. This may unintentionally trigger the motion sensor. Thus, it is beneficial to determine if the user is operating the portable device if motion is detected while the portable device is being charged. The third light setting may be the same as the first light setting (e.g. a light setting with a brightness lower than the brightness of the second light setting). The third light setting may be an active light setting that was already active before obtaining the signal indicative of the user operating the portable device. In other words, in this case the light setting of the lighting unit does not change when the motion is detected while the user is operating the portable device and when the portable device is connected to the charger.

The method may further comprise: changing the light setting of the lighting unit when the status of the portable device changes. This may be beneficial, because it indicates the change of the charging status (from connected to non-connected or vice versa). Additionally, this may be beneficial because typically when a user removes his or her device from a charger, the user performs a specific activity (e.g. leaving the area, operating the portable device, etc.), which activity may require a different light setting. The new light setting may be based on an expected and/or detected activity of the user. The method may comprise: changing the light setting to a new light setting having a higher brightness and/or a higher color temperature if the status of the portable device changes from connected to the charger to unconnected to the charger, and changing the light setting to a new light setting having a lower brightness and/or a lower color temperature if the status of the portable device changes from unconnected to the charger to connected to the charger. Disconnecting the portable device may be indicative that the user is waking up, which may require to increase the light output of the lighting unit and/or to increase the color temperature to provide light that corresponds to the user's circadian rhythm. Charging the portable device may be indicative that the user is going to bed, which may require to dim the light and/or decrease the color temperature to provide light that corresponds to the user's circadian rhythm.

The first light setting and the second light setting may be determined based on an activity of the user. The activity may be a current activity or an upcoming activity. The current and/or upcoming activity may be detected (e.g. using one or more sensors such as a motion sensor), or it may be an expected activity (e.g. based on a user schedule, based on information from an activity learning system, etc.).

The lighting unit may be controlled according to the first light setting only if the motion exceeds a predefined motion threshold. It may be beneficial to only control the lighting unit according to the first light setting if there's a sufficient amount of movement in the area to reduce the chance of false positives.

The area may comprise a plurality of lighting units, and the method may further comprise: determining a position of the portable device relative to the plurality of lighting units when the portable device is connected to the charger, and selecting the lighting device from the plurality of lighting units based on the (relative) position of the portable device. This is beneficial, because it may be desirable that a specific (e.g. most proximate, most distant, etc.) lighting unit is selected.

The area may comprise a plurality of lighting units, and the method may further comprise: determining a position and/or an orientation of the user relative to the plurality of lighting units when the portable device is connected to the charger, and selecting the lighting device from the plurality of lighting units based on the position and/or orientation of the user. This is beneficial, because it may be desirable that a specific (e.g. most proximate, most distant, in the field of view of the user, outside the field of view of the user, etc.) lighting unit is selected.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for controlling a lighting unit in an area, the controller comprising:

an input configured to obtain a charging status of a portable device in the area, the charging status indicating whether the portable device is connected to a charger, and to receive a motion signal indicative of a motion of a user in the area, a processor configured to control, if the motion has been detected and if the portable device is connected to the charger, the lighting unit according to a first light setting, and configured to control, if the motion has been detected and if the portable device is not connected to the charger, the lighting unit according to a second light setting.

According to a fourth aspect of the present invention, the object is achieved by a system comprising the controller and a lighting unit configured to be controlled by the controller.

It should be understood that the computer program product, the controller and the lighting system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
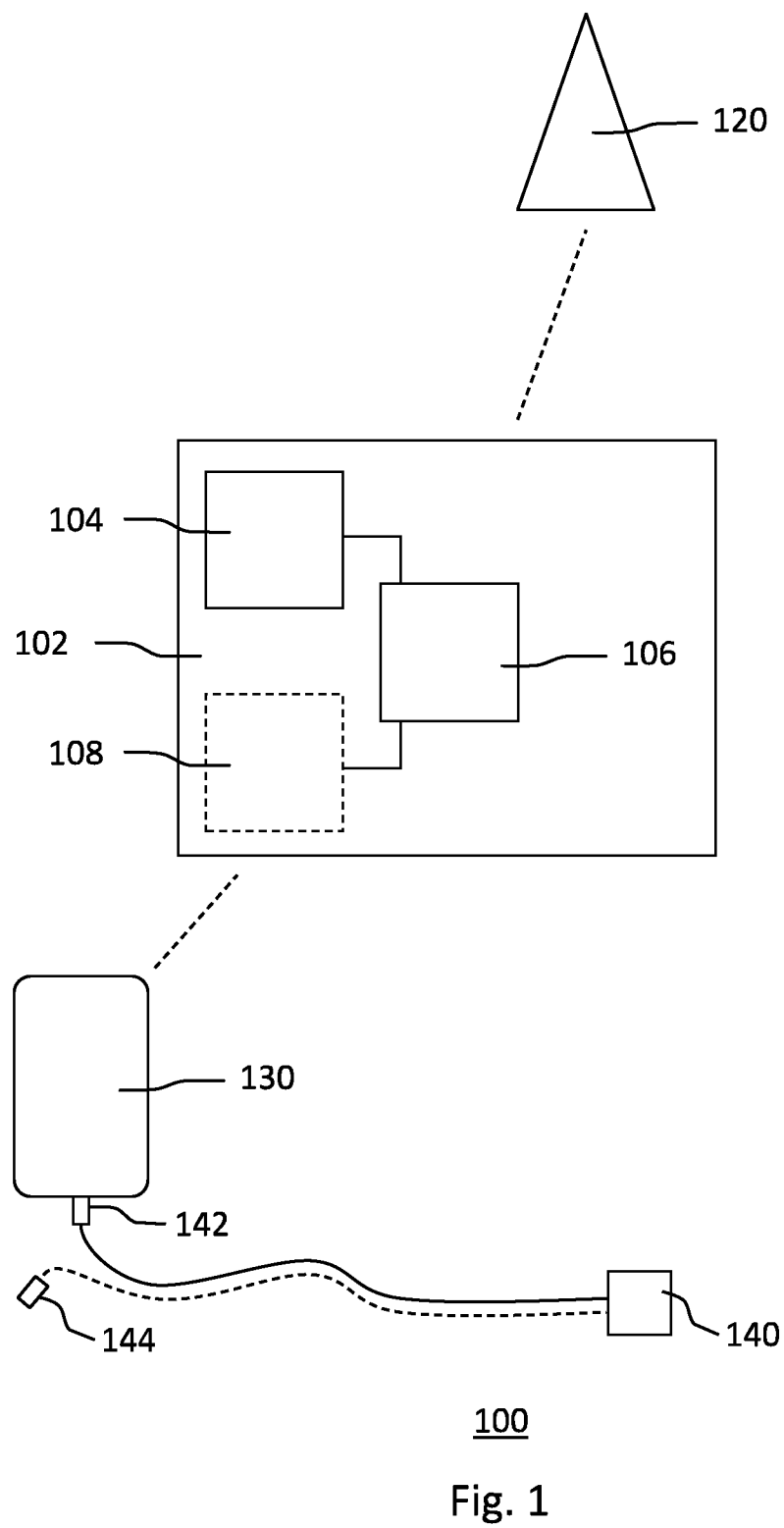
FIG. 1 shows schematically an example of a system comprising a lighting unit, a controller, a portable device and a charger.

FIG. 1 shows schematically an example of a system 100 comprising a lighting unit 120, a controller 102, a portable device 130 and a charger 140. The controller 102 is configured to control the lighting unit 120 which is located in an area. The controller 102 comprises an input 104 configured to obtain a charging status of the portable device 130 (which may for example be located in the area), the charging status indicating whether the portable device 133 is connected to the charger 140, and to receive a motion signal indicative of a motion of a user in the area. The controller 102 further comprises a processor 106 configured to control, if the motion has been detected and if the portable device 130 is connected 142 to the charger 140, the lighting unit 120 according to a first light setting, and configured to control, if the motion has been detected and if the portable device 130 is not connected to the charger 140, the lighting unit 120 according to a second light setting.

The lighting unit 120 may comprise one or more (LED) light sources. The lighting unit is configured to illuminate the space. The lighting unit 120 may be a light bulb, a light strip, a TLED, a light tiles, etc. The lighting unit may be an individually controllable light source of a luminaire (e.g. an LED strip). The lighting unit 120 may comprise a control unit, such as a microcontroller (not shown), for controlling the light output generated by the one or more light sources based on received lighting control commands (which may be based on the light settings, which may be received from the controller 102). The lighting unit 104 may comprise a receiver configured to (wirelessly) receive the lighting control commands, for instance via Bluetooth, Zigbee, Wi-Fi, Thread, etc. A lighting control command (defining a light setting) may comprise lighting control instructions for controlling the light output, such as the color, intensity, saturation, beam size, beam shape, etc. of the one or more light sources. Alternatively, the light setting may be a lighting control routine which may define one or more lighting control instructions according to which the lighting unit 120 is to be controlled. The lighting control routine may define a trigger condition whereupon the lighting control instructions are executed. Examples of trigger conditions may be a time of day, a sensor input from a sensor, a user input provided by a user, etc. The portable device 130 may be any type of portable device carried by a user. Examples of portable devices 130 include but are not limited to smartphones, smartwatches, smartglasses, tablet pcs, etc. The portable device 130 comprise a charging module and a battery, and a means for receiving (wireless/wired) power from the charger 140. The charger may be a wired charger or a wireless charger (e.g. an inductive charger, a microwave charger, a laser charger, etc.). Different techniques for charging portable devices are known in the art and will therefore not be discussed in detail. The portable device 130 and/or the charger 140 may be configured to communicate the charging status of the portable device 130 to the controller 102.

In the example of FIG. 1, the controller 102 is illustrated as a separate device. The controller 102 may be comprised in a central lighting control device such as a bridge, a central home control system, a remote server of a remote control system (connected via the internet), etc. In other examples, depending on the system architecture, the controller 102 may be comprised in the lighting unit 120, in a sensor device 202 external from the portable device 130 and external from the lighting unit 120 or in the portable device 130.

The input 104 is configured to obtain the charging status of the portable device in the area, and to receive a motion signal indicative of a motion of a user in the area. When the controller 102 is comprised in a separate device (e.g. a bridge, a central home control system, a remote server, etc.) or in the lighting device, the input 104 may be a communication unit configured to wirelessly communicate with the portable device 130 (for instance to receive the charging status) and/or a motion sensor (for instance to receive the motion signal). The communication unit may be configured to communicate via any (wireless) communication protocol (e.g. Bluetooth, Wi-Fi, Li-Fi, Thread, ZigBee, etc.) with the devices in the system 100. In other examples, the input 104 may be an input to the processor 106. For instance, when the controller 102 is comprised in the portable device 130, the input 104 may receive the charging status of a charging module of the portable device 130. In another example, when the controller 102 is comprised in a sensor device 202, the input may receive the motion signal from a motion sensor in the sensor device 202. It should be understood that the above-mentioned examples are merely examples of the input 104, and that the skilled person is able to, depending on the system architecture, design alternatives without departing from the scope of the appended claims.

The processor 106 is configured to control, if the motion has been detected and if the portable device 130 is connected (as illustrated by numeral 142) to the charger 140, the lighting unit 120 according to the first light setting. The processor 106 is further configured to control, if the motion has been detected and if the portable device 130 is not connected (as illustrated by numeral 144) to the charger, the lighting unit 120 according to the second light setting. The processor 106 may, for example, access a memory 108 (which may be comprised in the controller 102 or in a remote device, for instance on a remote server), which may store a lookup table comprising associations between motion, charging statuses and light settings. Alternatively, the processor may determine the first and second light settings based on, for example, contextual parameters such as the time of day, a light level in the area (which may be obtained from a light sensor located in the area), based on a current or an expected activity of a user in the area, etc. The processor 106 may be configured to communicate lighting control commands that define the light settings to the lighting unit 120 via a communication unit. The input 104 may for example serve as a transceiver for communicating the lighting control commands, of the controller 102 may comprise a separate communication unit. In embodiments wherein the controller 102 is comprised in the lighting unit 120, the processor 106 may control the light sources of the lighting unit directly according to the first/second light setting.

The first light setting may have a lower brightness and/or a lower color temperature than the second light setting. The processor 106 may be configured to apply these light settings only during a specific period, for instance at night from 23:00-07:00. The first light setting may, for example, have a 20% brightness and the second light setting may have a 40% brightness. The first light setting may, for example, be white light with a color temperature of 2700K, the second light setting may be white light with a color temperature of 4000K.

The processor 106 may be configured to determine/select the first and/or the second light setting depending on a time of day at which the motion is detected. If, for example, the motion is detected in the evening, the first light setting may be a light setting with a first intensity and the second light setting may be a light setting with a second intensity higher than the first intensity, while if, for example, motion is detected at night, the first light setting may be a light setting with a third intensity lower than the first intensity.

Figure 2:
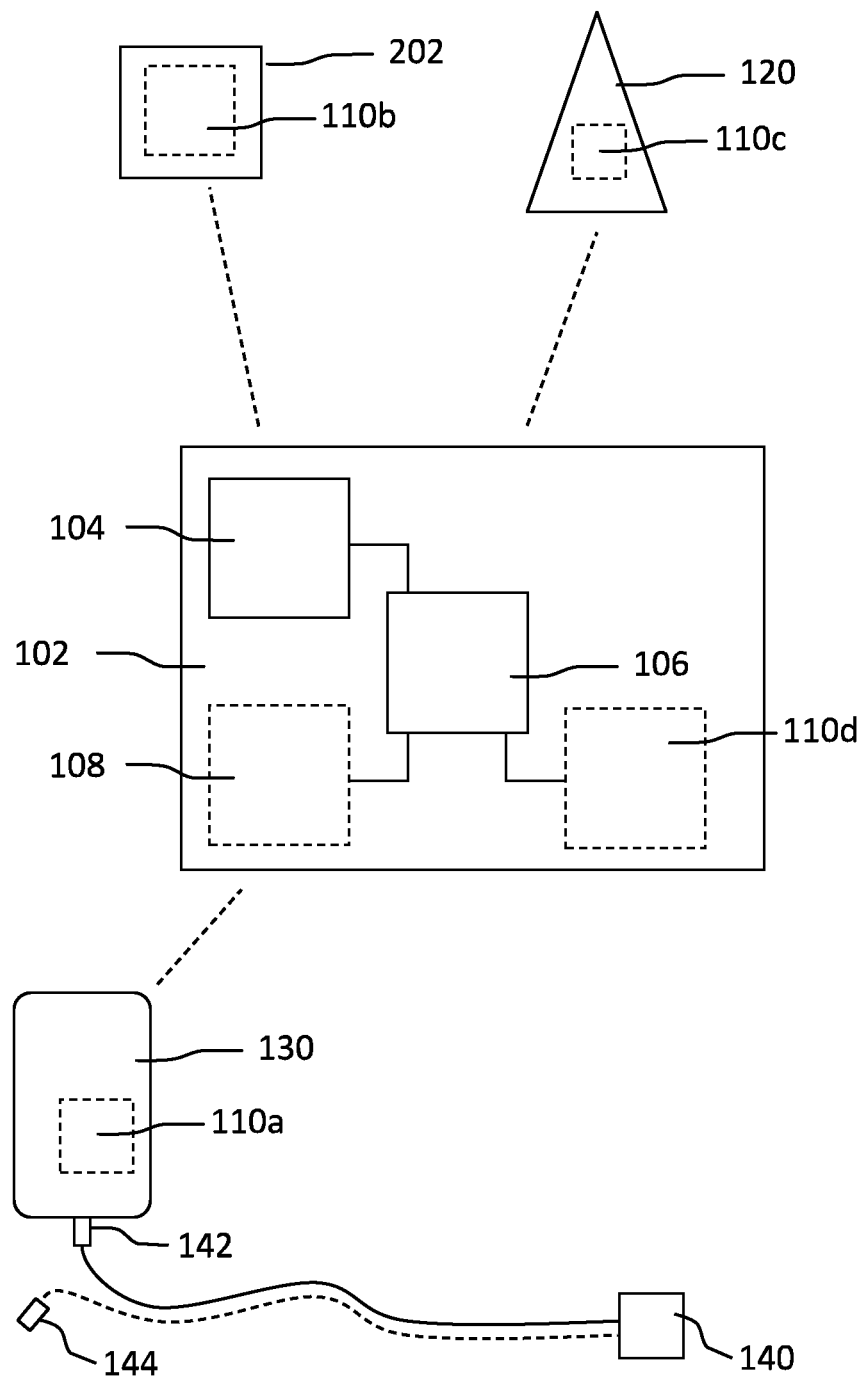
FIG. 2 shows schematically an example of a system of FIG. 1 comprising a motion sensor.

The system 100 comprises a motion sensor located in the area to detect motion of the user, and to provide/communicate the motion signal to the controller 102. FIG. 2 illustrates different examples of motion sensors 110a, 110b, 110c, 110d.

In a first example, the motion sensor 110a (e.g. an accelerometer, magnetometer, camera and/or a gyroscope) may be comprised in the portable device 130. The motion of the user may be detected by that motion sensor 110a, and the motion signal indicative of the motion of the user may be provided to the controller 102. The user may, for example, pick up his or her portable device 130 which may result in the detected motion. The controller 102 may obtain the charging status and control the lighting unit 120 based on the charging status. If the portable device 130 is connected 142 to the charger, the lighting unit 120 is controlled according to the first light setting, and if the portable device 130 is not connected 144 to the charger, the lighting unit 120 is controlled according to the second light setting. The motion signal provided by the motion sensor 110*a* may be analyzed by the processor 106 to determine a type of motion of a user (e.g. walking vs. operating the portable device). The processor 106 may analyze the motion signal to identify a motion signature indicative of the type of motion. A repetitive motion may be indicative of that the portable device 130 is located in the user's pocket, whereas minor unrepetitive motions may be indicative of that the user is operating the portable device 130. The controller 102 may then control the lighting unit 120 accordingly, for instance, the light setting may be different when the motion is representative of a user operating the portable device compared to when the motion is representative of that the user is walking and that the portable device is located in the user's pocket. In a further example, wherein the charger is a wireless charger and the motion sensor 110*a* is comprised in the portable device 130, the processor 106 may be further configured to detect, when motion is detected by the motion sensor 110*a* is comprised in the portable device 130, if the charging status changes from connected 142 to the charger to disconnected 144 from the charger. If the charging status changes, the processor 106 may determine to control the lighting unit 120 according to a third light setting. The third light setting may for example be the same as the first light setting (e.g. a light setting with a brightness lower than the brightness of the second light setting), or the third light setting may be an active light setting that was already active before obtaining the signal indicative of the user operating the portable device 130. If the charging status does not change, and the processor 106 determines that the user is operating the portable device 130 without removing the portable device 130 from the charger, the processor 106 may determine to control the lighting unit 120 according to a fourth light setting (which may be the same as the first light setting, or which may be a light setting different from the first, the second and the third light setting).

In another example, the motion sensor 110*b* (e.g. a PIR sensor, a (passive) RF sensor, an ultrasound sensor, a camera, etc.) may be comprised in a sensor device 202. The motion of the user may be detected by the motion sensor 110*b* comprised in the sensor device located in the area, and the motion signal indicative of the motion of the user may be provided to the controller 102. The processor 106 may be further configured to obtain a signal (e.g. from the portable device 130) indicative of a user operating the portable device 130. The processor 106 may be further configured to control, if motion is detected by the motion sensor 110*b* of the sensor device 202 and if the user is operating the portable device 130 and if the portable device 130 is connected 142 to the charger 140, the lighting unit 120 according to a third light setting. It may occur that a user moves when operating the portable device 130 which may unintentionally trigger the motion sensor 110*b*. Thus, it is beneficial to determine if the user is operating the portable device 130 if motion is detected while the portable device is connected 142 to the charger 140. The third light setting may for example be the same as the first light setting (e.g. a light setting with a brightness lower than the brightness of the second light setting), or the third light setting may be an active light setting that was already active before obtaining the signal indicative of the user operating the portable device 130.

The motion sensor may, for example, be a PIR sensor, a (passive) RF sensor, an ultrasound sensor, a camera, etc. The motion sensor may be configured to differentiate between motion in different subareas of the area. The motion sensor may, for example, comprise a plurality of sensing zones that correspond to the subareas. This enables the motion sensor, for instance, to distinguish motion of users in bed from motion in users out of bed or near room entrance. The processor 106 may be further configured to select/determine the first and/or the second light setting based on in which subarea the motion has been detected. The subarea in which the motion is detected may be further indicative of the activity of the user, and the activity of the user may be determined based on in which subarea the motion is detected. For instance, when the motion is detected in a subarea that corresponds to a user's bed, the activity may be sleeping or preparing for sleep, whereas the motion is detected near an entrance of a room, the activity may be entering or exiting the room.

The processor 106 may be further configured to change the light setting of the lighting unit 120 when the charging status of the portable device changes. The processor 106 may, for example, be configured to set the light setting to a new light setting having a higher brightness and/or a higher color temperature if the charging status of the portable device 130 changes from connected 142 to unconnected 144, and to change the light setting to a new light setting having a lower brightness and/or a lower color temperature if the charging of the portable device 130 changes from unconnected 144 to connected 142.

The first light setting and the second light setting may be determined based on an activity of the user. The activity of the user may be a current activity or an upcoming activity. The current and/or upcoming activity may be detected (e.g. using one or more sensors such as motion sensors, camera's, etc.). Alternatively, the activity may be an expected/planned/learnt activity (e.g. based on a user schedule, based on information from an activity learning system, etc.). The activity may be derived from the motion signal, and the processor 106 may select/determine the first and/or second light setting based thereon. Techniques for activity detection or prediction are known in the art and will therefore not be discussed in detail. The processor 106 may, for example, determine that a user is reading a book while the portable device 130 is connected 142 and motion is detected, and select a reading light setting as the first light setting based thereon. In another example, the processor 106 may determine that a user is sleeping while the portable device 130 is connected 142 and motion is detected, and select a sleep light setting (e.g. a light setting with a very low/no brightness) as the first light setting based thereon. In another example, the processor 106 may determine that a user is walking while the portable device 130 is connected 142 and motion is detected, and select a guide light setting (e.g. a light setting with a brightness high enough to guide the user though the area but low enough not to blind the user) as the first light setting based thereon.

The processor 106 may be further configured to control the lighting unit according to the first light setting only if the motion exceeds a predefined motion threshold. If the motion does not exceed the threshold, the current light setting (e.g. "off") of the lighting unit 120 may be maintained.

Figure 3:
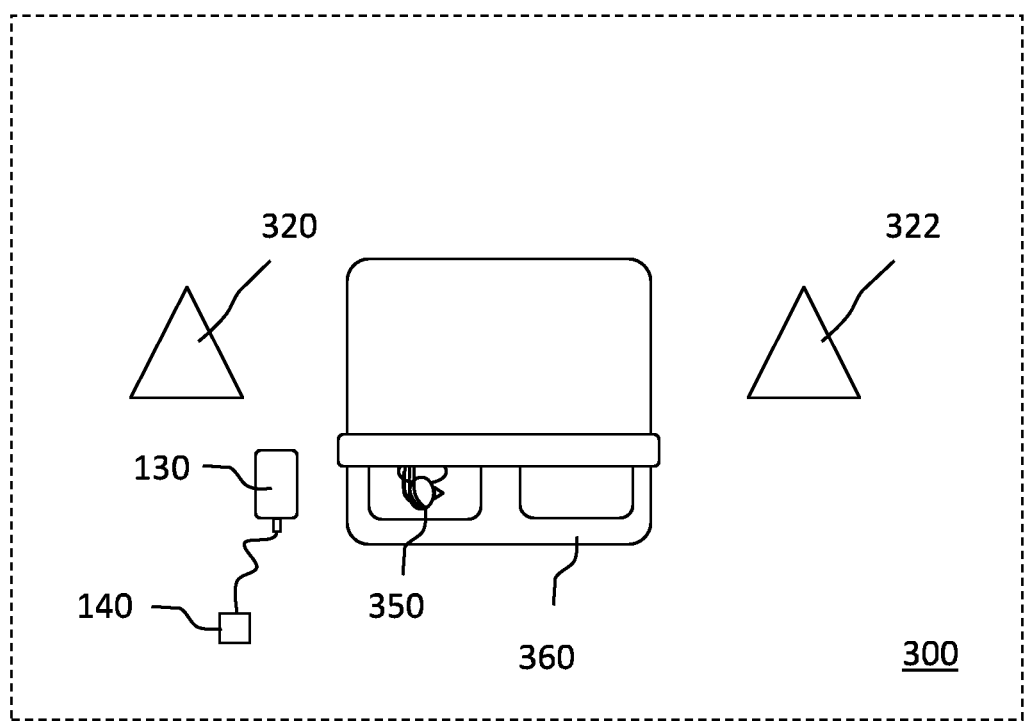
FIG. 3 shows schematically an example of an area comprising a plurality of lighting units.

The area may comprise a plurality of lighting units. The processor 106 may be configured to determine a position of the portable device relative to the plurality of lighting units when the portable device is connected 142 to the charger 140, and select the lighting device 120 from the plurality of lighting units based on the position of the portable device 130. Alternatively, the processor 106 may be configured to determine a position and/or an orientation of the user relative to the plurality of lighting units when the portable device is connected 142 to the charger 140, and select the lighting device 120 from the plurality of lighting units based on the position and/or orientation of the user. The positions of the lighting units and the portable device or user may be obtained from an (indoor) positioning system, for instance an RF-based positioning system, a coded light positioning system, a camera-based positioning system, etc. Techniques for detecting positions of devices and users in an area are known in the art and will therefore not be discussed in detail. FIG. 3 shows an example of an area 300 comprising a plurality of lighting units 320, 322, the portable device 130 connected to the charger 140 and a user 350. The processor 106 (not shown in FIG. 3) may receive position information indicative of the positions of the lighting units 320, 322. In a first example, the processor 106 may obtain the position of the portable device 130 and select the most proximate lighting unit 320 and control that lighting unit 320 according to the first light setting when motion is detected. In another example, the processor 106 may obtain the position of the user 350 (e.g. form a presence sensor in the bed 360, from an RF-based positioning system, etc.) and select the most proximate lighting unit 320 and control that lighting unit 320 according to the first light setting when motion is detected. In another example, the processor 106 may obtain the orientation of the user 350 (e.g. from a presence sensor in the bed 360, based on breathing detection using one or more microphones, etc.) and select lighting unit 322 towards which the user is oriented, and control that lighting unit 322 according to the first light setting when motion is detected.

Figure 4:
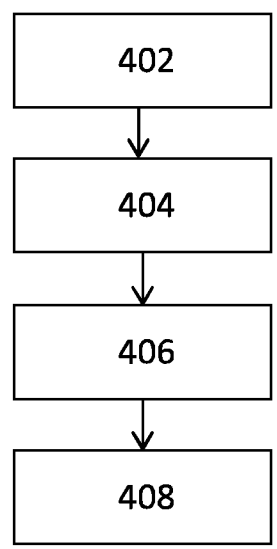
FIG. 4 shows schematically a method of controlling a lighting unit in an area.

FIG. 4 shows a method 400 of controlling a lighting unit in an area, the method comprising:
  obtaining 402 a charging status of a portable device in the area, the charging status indicating whether the portable device is connected to a charger,
  receive 404 a motion signal indicative of a motion of a user in the area,
  controlling 406, if the motion has been detected and if the portable device is connected to the charger, the lighting unit according to a first light setting, and
  controlling 408, if the motion has been detected and if the portable device is not connected to the charger, the lighting unit according to a second light setting.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a lighting unit in an area, the method comprising:
  obtaining a charging status of a portable device, the charging status indicating whether the portable device is connected to a charger,
  receive a motion signal indicative of a motion of a user in the area,
  controlling, if the motion has been detected and if the portable device is connected to the charger, the lighting unit according to a first light setting, and
  controlling, if the motion has been detected and if the portable device is not connected to the charger, the lighting unit according to a second light setting.

2. The method of claim 1, wherein the first light setting has a lower brightness and/or a lower color temperature than the second light setting.

3. The method of claim 1, wherein the motion of the user is detected by a motion sensor comprised in the portable device.

4. The method of claim 1, wherein the motion of the user is detected by a sensor device located in the area.

5. The method of claim 4, wherein the method comprises:
  obtaining a signal indicative of a user operating the portable device, and
  controlling, if motion is detected by the sensor device located in the area, if the user is operating the portable device and if the portable device is connected to the charger, the lighting unit according to a third light setting.

6. The method of claim 5, wherein the third light setting is an active light setting already active before obtaining the signal.

7. The method of claim 1, further comprising:
  changing the light setting of the lighting unit when the charging status of the portable device changes.

8. The method of claim 7, wherein the method comprises:
  changing the light setting to a new light setting having a higher brightness and/or a higher color temperature if the status of the portable device changes from connected to the charger to unconnected to the charger, and
  changing the light setting to a new light setting having a lower brightness and/or a lower color temperature if the status of the portable device changes from unconnected to the charger to connected to the charger.

9. The method of claim 1, wherein the first light setting and the second light setting are determined based on an activity of the user.

10. The method of claim 1, wherein the lighting unit is controlled according to the first light setting only if the motion exceeds a predefined motion threshold.

11. The method of claim 1, wherein the area comprises a plurality of lighting units, and the method further comprises:
   determining a position of the portable device relative to the plurality of lighting units when the portable device is connected to the charger, and
   selecting the lighting device from the plurality of lighting units based on the position of the portable device when the portable device is connected to the charger.

12. The method of claim 1, wherein the area comprises a plurality of lighting units, and the method further comprises:
   determining a position and/or an orientation of the user relative to the plurality of lighting units, and
   selecting the lighting device from the plurality of lighting units based on the position and/or orientation of the user.

13. A computer program product for a computing device, the computer program product comprising computer program code to perform the method of claim 1 when the computer program product is run on a processing unit of the computing device.

14. A controller for controlling a lighting unit in an area, the controller comprising:
   an input configured to obtain a charging status of a portable device, the charging status indicating whether the portable device is connected to a charger, and to receive a motion signal indicative of a motion of a user in the area,
   a processor configured to control, if the motion has been detected and if the portable device is connected to the charger, the lighting unit according to a first light setting, and configured to control, if the motion has been detected and if the portable device; is not connected to the charger, the lighting unit according to a second light setting.

15. A system comprising:
   the controller of claim 14,
   a lighting unit configured to be controlled by the controller.

* * * * *